J. W. HARRIS.
MANURE LOADER.
APPLICATION FILED MAY 23, 1918.

1,284,667.

Patented Nov. 12, 1918.
3 SHEETS—SHEET 1.

John W. Harris, Inventor

By E. E. Vrooman & Co.,
his Attorneys

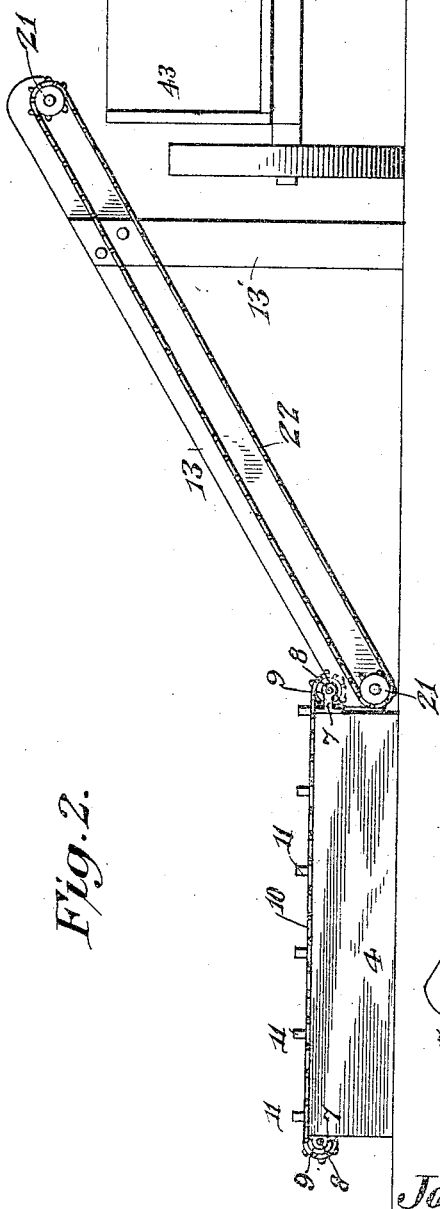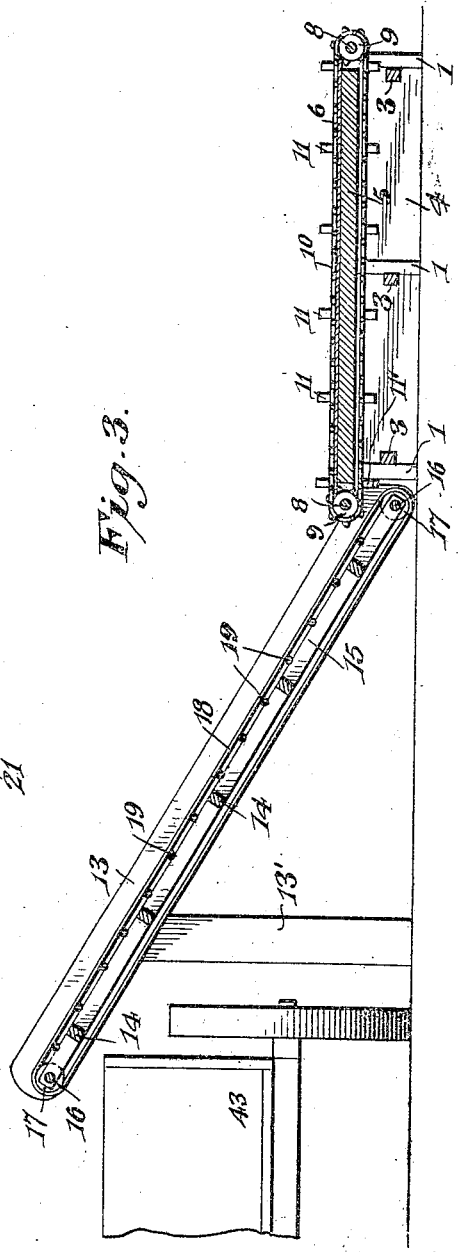

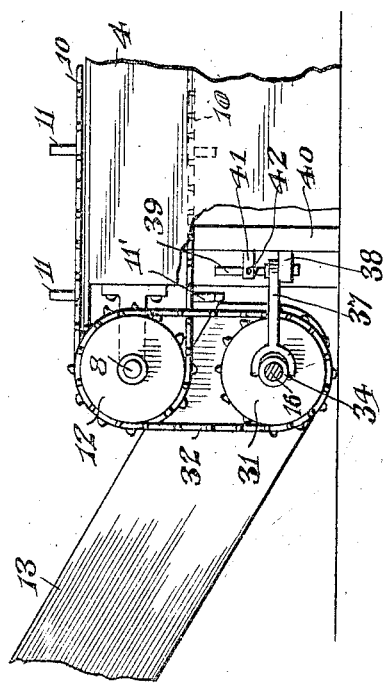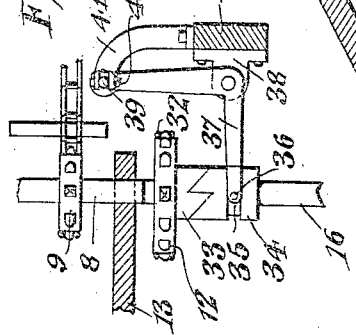

UNITED STATES PATENT OFFICE.

JOHN W. HARRIS, OF WESLEY, IOWA.

MANURE-LOADER.

1,284,667.  Specification of Letters Patent.  Patented Nov. 12, 1918.

Application filed May 23, 1918. Serial No. 236,224.

*To all whom it may concern:*

Be it known that I, JOHN W. HARRIS, a citizen of the United States of America, residing at Wesley, in the county of Kossuth and State of Iowa, have invented certain new and useful Improvements in Manure-Loaders, of which the following is a specification, reference being had therein to the accompanying drawing.

This invention relates to a manure loader, and has for its principal object the production of a plurality of conveyers arranged so as to permit the manure to be deposited upon the lower conveyer and then be moved to an elevated position and finally deposited in a suitable conveyance at the upper end of the elevating conveyer.

Another object of this invention is the production of a manure loader wherein the horizontal conveyer is provided with slanting side boards, arranged so as to permit draft animals or motive power to be applied to a conveyance or scoop or like element, for dragging or depositing manure upon the lower conveyer prior to the movement of the manure on to the elevating conveyer.

Another object of this invention is the production of a manure loader, wherein an automatic clutch member is provided arranged so as to cause the two conveyers to operate in unison until the lower conveyer has completed one complete revolution, whereupon the clutch member will be automatically moved to an inoperative position, thus, causing the lower conveyer to be automatically stopped, although the elevating conveyer will continue to run.

A still further object of this invention is the production of a manure loader, wherein simple and efficient means is provided for reinforcing and driving the endless apron of the elevating conveyer and the conveyer element of the lower conveyer.

With these and other objects in view this invention consists of certain novel constructions, combinations and arrangements of parts, as will be hereinafter fully described and claimed.

In the accompanying drawings:—

Fig. 2 is a side elevation of the complete manure loader.

Fig. 3 is a central longitudinal section through the device.

Fig. 4 is a transverse section taken through the lower conveyer, as shown on the line 4—4 of Fig. 1, looking in the direction of the arrow.

Fig. 5 is an enlarged fragmentary elevation of a portion of the device, illustrating the manner in which certain gears are arranged for driving the horizontal or lower conveyer.

Fig. 6 is an enlarged sectional view through a portion of the elevating conveyer, showing the manner in which the rollers are provided for reinforcing the endless apron.

Fig. 7 is an enlarged plan view of the clutch, and operating elements thereof.

Figure 1:
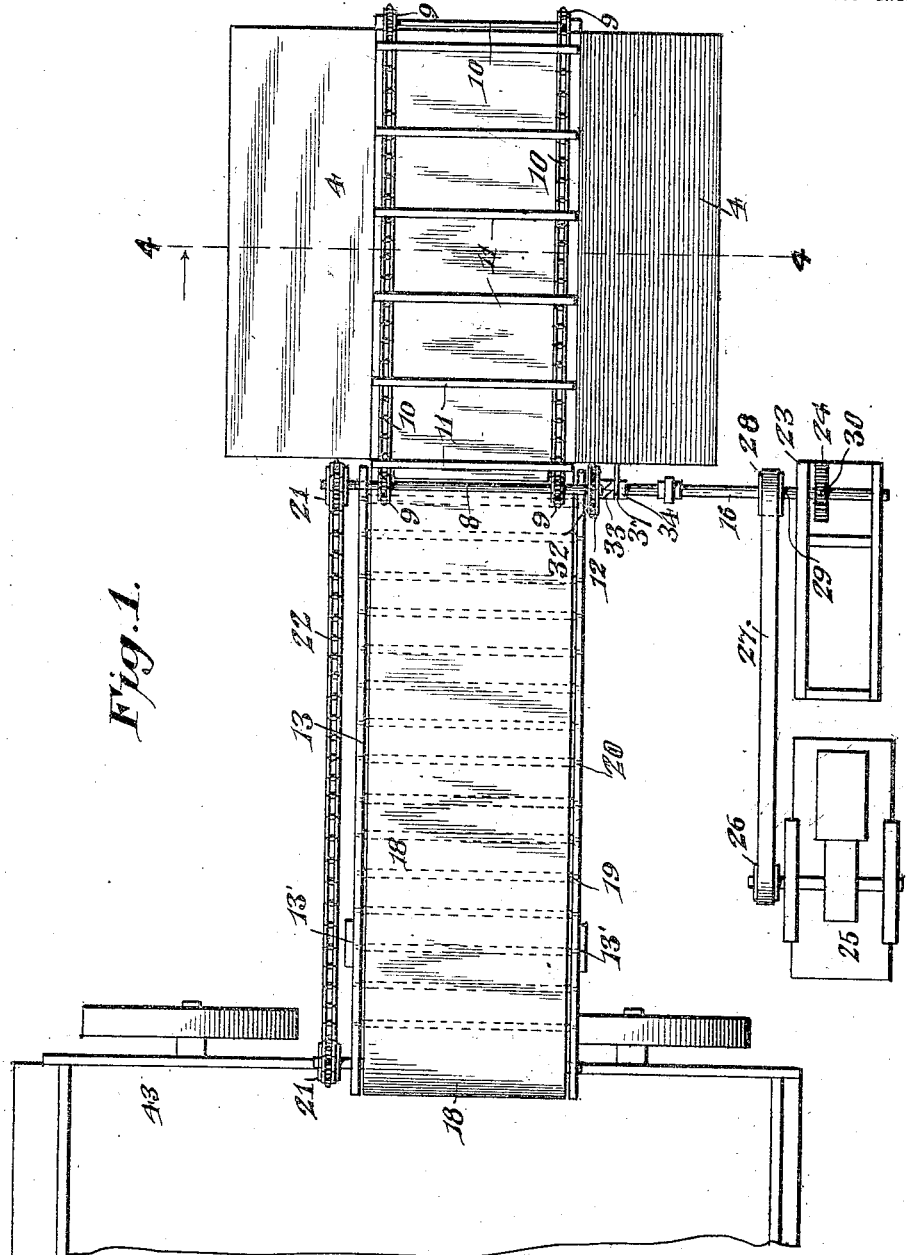
Figure 1 is a top plan view of the manure loader, as constructed in accordance with the present invention, and illustrating the same in condition for use.

By referring to the accompanying drawings by numerals, it will be seen that the lower or horizontal conveyer comprises side standards 1 and a central standard 2, while the horizontal transversely projecting beam 3 is fixedly secured to the standards 1 and 2, as clearly shown in Fig. 3, for holding these standards in vertically parallel positions. The side boards 4 are supported upon the standards 1, and the ends of the beams 3 as shown in Figs. 3 and 4. These side boards 4 extend from a point adjacent the ground and slant upwardly to support at their upper ends the fixed platform 5 which may be secured to the boards 4 in any suitable manner at a distance above the beams 3. It is of course obvious that the platform 5 may be provided with a metallic covering 6 for protecting its upper surfaces and also reducing friction thereon, when the device is in operation.

The platform 5 is provided adjacent its ends with brackets 7, as shown in Fig. 2, so as to carry the shafts 8 upon which the pinions 9 are carried. The chains 10 pass in parallel arrangement with respect to each other, as shown in Fig. 1 and extend the entire length of the horizontal conveyer, so as to pass around the pinions 9. It is obvious that the chain will bear upon the metal covering 6 of the platform 5 and will also engage the track elements 6' upon the lower surfaces of the platform 5. In this way, while the chain passes around the platform, friction upon the chain will be reduced, and will be held from wearing upon this platform. The parallel bars 11 are secured adjacent their ends to the chain 10, in any suitable manner, so that as the chains are moved the bars 11 which extend transversely across the platform will also move along the platform for moving manure which may be placed thereon. It of course should be understood that one of the shafts 8 is projected so as to carry the gear 12, which is keyed thereto, as are the gears 9 secured to this particular shaft. It is therefore obvious that as rotary motion is imparted to the gear 12, it will be imparted through the shaft 8 to the gears 9 for moving the chains 10 and the bars 11.

The elevating conveyer comprises a pair of parallel side boards 13 of comparatively broad construction, as shown in Figs. 2, 3 and 5, for purposes to be hereinafter set forth. The transversely projecting beams 14 are secured to the boards 13 for holding the same in their correct parallel relation, while the longitudinally extending beams 15 are connected to the beams 14 so as to be retained in their correct positions. The shafts 16 pass through the longitudinally extending beams 15 adjacent the ends of these beams as shown in Figs. 3 and 6, and these shafts 16 also project beyond one of the side boards 13 as shown in Fig. 1, while the lower of these shafts also extends outwardly beyond the opposite side of the remaining side board. These shafts 16 have disks 17 keyed thereon in any suitable manner, so as to cause the endless apron 18 to be efficiently supported upon these disks 17. It should of course be understood that the apron 18 will be supported intermediate the ends of the elevating conveyer, by the rollers 19 which have reduced ends 20 loosely mounted in the side boards 13. These rollers 19 are carried in parallel relation with respect to each other, as shown in Fig. 6 and illustrated in dotted lines in Fig. 1, and particularly close to each other, so as to efficiently support the endless apron 19 when the same is in operation. The shafts 16 have gears 21 secured at their projecting ends, and these gears 21 are connected by means of an endless chain 22. The shaft 16 which has both ends projecting beyond the side boards 13 has one projecting end secured or mounted upon the supporting frame 23 and within the frame the shaft 16 is provided with the enlarged gear 24.

An engine 25 which of course may be of any desired construction is provided with a pulley 26, around which the belt 27 passes, and this belt 27 may pass around the pulley 28 mounted upon the stub shaft 29 supported upon the frame 23. A pinion 30 is also keyed upon the shaft 29 and meshes with a gear 24, so that when the engine is in operation, the belt 27 will be driven so as to impart rotary motion to the pulley 28 which in turn will rotate the shaft 29 for rotating the pinion 30. As this pinion 30 rotates, it of course will drive the gear 24 so as to rotate the lower shaft 16. As this lower shaft 16 is rotated it will of course cause the endless apron 18 to be driven continuously, as long as the engine is in operation.

The gear 31 is loosely mounted upon the lower shaft 16 and is connected by means of the endless chain 32 to the gear 12 of the horizontal conveyer. The primary section 33 of the clutch is fixedly carried upon the gear 31, while the auxiliary section 34 of this clutch is keyed upon the lower shaft 16, although being formed to slide along this shaft into engagement with this section. This auxiliary section 34 is provided with an annular groove 35 in which the pin 36 and bell crank lever 37 fits, as illustrated in Figs. 1 and 7. This bell crank lever 37 is mounted upon the supporting part 40 as shown in Fig. 5, by being pivotally supported upon the bracket 38 fixedly mounted upon this particular part. The lever 39 is pivotally mounted upon a supporting post 40 as shown at 41, and this lever 39 is pivotally connected as indicated to the bell crank lever 37. The bar 11' is slightly thicker than the remaining bars 11, and as a consequence, will engage the lever 39 for swinging the lever in one direction, whereby when the lever is swung in one direction it will swing the bell crank lever 37 for moving the auxiliary section 34 from engagement with the primary section 33, whereby the movement of the gear 31 will cease, thus, causing the operation of the horizontal conveyer to stop.

When this device is in operation, it will assume the position shown in Figs. 1 and 2. Draft animals or motive power may be applied to a suitable conveyance or scoop for depositing or dragging manure upon the platform of the horizontal conveyer. The side boards 4 will facilitate the movement of such a conveyance or scoop upwardly on to the conveyer, prior to the starting of this lower conveyer. When a sufficient quantity of manure has been deposited upon this horizontal conveyer then the engine 25 may be started. As the horizontal conveyer now contains the deposit, the operation of the engine will drive the lower shaft 16 in a manner hereinbefore specified, so as to cause the elevating conveyer to be operated by the rotation of the shafts 16 and the engagement of the disks 17 carried by these shafts with the apron 18, while the rotation of the lower shaft 16 may cause the gears 31 and 12 to be operated when the clutch is in operation, as shown in Fig. 1. This rotation of the gear 12 will cause one of the shafts 8 to be rotated, thereby causing the gears upon this particular shaft to drive the chain passing around these gears, and this chain will in turn rotate the gears upon the remaining shaft 8, whereby the chain will be moved so as to move the transversely projecting bars 11 along over the metal cover 6 of the platform 5. The manure which is at this time deposited upon the platform will be dragged by the bars 11 and deposited upon the apron 18 of the elevating conveyer. As the manure is deposited upon this elevating conveyer it will be conveyed by the apron 18 over the upper end of the elevating conveyer. At this time a suitable conveyance 43 may be positioned adjacent the upper end of this elevating conveyer so as to receive the manure which is finally discharged from the upper end of the elevating conveyer. It of course should be understood that the side boards 13 are of comparatively broad construction so as to extend beyond the apron 18, as shown in Fig. 3 for preventing the side displacement of the manure, as the same is being conveyed upwardly by the apron 18. It should further be understood that this apron 18 will be held from sagging by the support given thereto by the rollers 19.

In order to provide sufficient time for the depositing of manure upon the horizontal conveyer without necessitating the stopping of the engine 25, the thickened bar 11' is provided so as to swing the lever 39 which in turn will actuate the bell crank lever 37, whereby this bell crank lever will swing the auxiliary section of the clutch 34 from engagement with the primary section 33 of this clutch. Although the auxiliary section will continue to rotate with the lower shaft 16, the gear 31 will cease to rotate as it is loosely mounted upon this shaft. As a consequence, the chain 32 will stop this driving action of the gear 12, whereby the chains 10 will stop, thus, causing the operation of the horizontal conveyer to cease. At this time another deposit of manure may be made upon the horizontal conveyer, and after the conveyance or element which deposits the manure upon the horizontal conveyer has been removed from the platform and the side boards 4, the bell crank lever 37 may be manually swung so as to move the auxiliary section 34 into engagement with the primary section 33, thereby causing the horizontal conveyer to be started, inasmuch as at this time the engine will be driving the lower shaft 16. As the horizontal conveyer is started, the bars thereof will drag the manure from the platform 5, depositing the manure upon the elevating conveyer, so as to permit this manure to be elevated to the upper end of the elevating conveyer from where it will be discharged. This operation may continue as long as desired, and it will be noted that the horizontal conveyer will be automatically stopped from this operation after one complete revolution of the chains 10, thus, allowing sufficient time for the depositing or carrying of a load of manure upon this shaft.

From the foregoing description, it will be seen that a very efficient manure loader, has been provided wherein an engine may continue to run while a deposit is being made upon the horizontal conveyer, although after this deposit has been made, the horizontal conveyer may be started to operate in unison with the elevating conveyer. As soon as the deposit has been entirely removed from the horizontal conveyer, the horizontal conveyer will be automatically stopped, although the elevating conveyer will continue to run. It will further be seen that a very simple and efficient supporting means has been provided for the conveyer, so as to hold the apron of the elevating conveyer from sagging, while the chains and bars of the horizontal conveyer will be supported so as to drag the manure from the platform with the least amount of friction. It is of course obvious that it is impractical to provide the endless apron, for the horizontal conveyer, inasmuch as the draft animals or motive power which draws the conveyance or implement on to the platform for making the deposit thereon, would injure an apron if such an apron were used upon the horizontal conveyer.

It is of course obvious that many minor detail changes may be made in the construction of this manure loader, such for instance, as the changing of the special structure used for the automatic disengagement of the clutch section, without departing from the spirit of this invention, and therefore it is not intended to limit the construction of this device to the specific form as herein shown, but to include all such forms of the structure as properly come within the scope of the invention as claimed.

What is claimed is:—

1. In a manure loader of the class described, the combination of a horizontal conveyer, slanting side boards connected to said horizontal conveyer, whereby a conveyance or implement may be drawn by the slanting side boards on to the horizontal conveyer for making a deposit thereon, an upwardly slanting conveyer projecting from below one end of said horizontal conveyer, means for driving said conveyers, whereby the deposit may be removed from said horizontal conveyer and deposited upon said elevating conveyer to be elevated to the upper end of said elevating conveyer, and means for automatically stopping the operation of said horizontal conveyer, although permitting the continued operation of the elevating conveyer, thereby allowing sufficient time for another deposit to be made upon said horizontal conveyer.

2. In a manure loader of the class described, the combination of a horizontal conveyer, said horizontal conveyer comprising a platform, side boards extending from said platform, slanting downwardly toward their outer portions, means for supporting said platform and said boards, chains passing around said platform and bearing thereon, means for driving said chains and bars carried upon said chains, and extending transversely across said platform, whereby deposits may be made upon said platform, and may be removed therefrom by said bars, an elevating conveyer projecting from below one end of said horizontal conveyer, and means for driving said conveyers, for causing the deposits made upon said horizontal conveyer to be elevated by said elevating conveyer, so as to be deposited in a conveyance or receptacle at the upper end of said elevating conveyer.

3. In a manure loader of the class described, the combination of a horizontal conveyer, said horizontal conveyer comprising a platform, said boards extending downwardly from the sides of said platform, means for supporting said side boards and platform, chains passing around said platform, means for driving said chains, transversely extending bars carried upon said chains, whereby said chains are driven, said bars will drag the deposit positioned upon said platform toward one end thereof, an elevating conveyer projecting upwardly from below one end of said horizontal conveyer, whereby a conveyance may be positioned at the upper end of said elevating conveyer, means for driving said elevating conveyer, whereby the deposit made upon said horizontal conveyer may be moved upwardly by said elevating conveyer and means for automatically stopping the operating of said horizontal conveyer.

4. In a manure loader of the class described, the combination of a horizontal conveyer, an elevating conveyer extending from a point below one end of said horizontal conveyer, a shaft connected to said elevating conveyer, means for driving said shaft, whereby said elevating conveyer may be operated, a gear loosely mounted upon said shaft, a primary clutch section fixedly mounted upon said gear, an auxiliary clutch section keyed upon said shaft, and being adapted to slide thereon, a bell crank lever connected to said auxiliary clutch section, a lever pivotally connected to said bell crank lever, a shaft connected to said horizontal conveyer and having a gear keyed upon one end, a chain passing around said gears, said clutch sections being adapted to be moved into engagement with each other, whereby said gears and chain will operate in unison for driving said horizontal conveyer, said horizontal conveyer having a thickened bar, said thickened bar being adapted to engage said last mentioned lever upon each complete revolution of said horizontal conveyer, whereby said levers will be swung for moving said clutch sections apart, thereby causing said horizontal conveyer to be automatically stopped.

In testimony whereof I hereunto affix my signature.

JOHN W. HARRIS.